(12) United States Patent
Weir et al.

(10) Patent No.: US 7,648,687 B1
(45) Date of Patent: Jan. 19, 2010

(54) METHOD OF PURIFYING BARIUM NITRATE AQUEOUS SOLUTION

(75) Inventors: Richard D. Weir, Cedar Park, TX (US); Carl W. Nelson, Austin, TX (US)

(73) Assignee: EEStor, Inc., Cedar Park, TX (US)

( * ) Notice: Subject to any disclaimer, the term of this patent is extended or adjusted under 35 U.S.C. 154(b) by 5 days.

(21) Appl. No.: 11/453,581

(22) Filed: Jun. 15, 2006

(51) Int. Cl.
| | |
|---|---|
| B01D 3/00 | (2006.01) |
| B01D 11/00 | (2006.01) |
| C02F 1/26 | (2006.01) |
| B01D 15/00 | (2006.01) |
| C02F 1/44 | (2006.01) |
| B01D 11/04 | (2006.01) |
| B01J 39/00 | (2006.01) |
| C02F 1/42 | (2006.01) |
| G21F 9/04 | (2006.01) |
| C01F 1/00 | (2006.01) |
| C01F 5/00 | (2006.01) |
| C01F 11/00 | (2006.01) |
| C22B 26/20 | (2006.01) |
| C22B 26/10 | (2006.01) |
| C22B 26/12 | (2006.01) |
| C01B 21/48 | (2006.01) |
| C01D 9/00 | (2006.01) |
| C01D 15/10 | (2006.01) |
| C01F 5/38 | (2006.01) |
| C01F 7/66 | (2006.01) |
| C01F 11/36 | (2006.01) |
| C01B 21/06 | (2006.01) |

(52) U.S. Cl. .............. 423/157; 423/155; 423/181; 423/395; 423/397; 423/409; 210/633; 210/639; 210/642; 210/660; 210/663; 210/681

(58) Field of Classification Search ............... 423/395, 423/397, 396, 394.2, 409
See application file for complete search history.

(56) References Cited

U.S. PATENT DOCUMENTS

| 3,947,553 A | * | 3/1976 | Moss et al. ............... 423/395 |
| 4,054,598 A | * | 10/1977 | Blum et al. ............... 562/13 |
| 4,671,618 A | | 6/1987 | Wu et al. |

(Continued)

FOREIGN PATENT DOCUMENTS

EP     1020487 A1    7/2000

(Continued)

OTHER PUBLICATIONS

Beheir et al. Studies on the liquid-liquid extraction and ion and precipitate flotation of Co(II) with decanoic acid. Journal of Radioanalytical and Nuclear Chemistry, Articles, vol. 174, No. 1 (1993) 13-22.*

(Continued)

*Primary Examiner*—Jerry Lorengo
*Assistant Examiner*—Jennifer A Smith

(57) ABSTRACT

Purification techniques have been developed for ceramic powder precursors, e.g., barium nitrate. These techniques can be performed using one or more of the following operations: (1) removal of impurities by precipitation or coprecipitation and separation using a nonmetallic-ion-containing strong base, e.g., tetraalkylammonium hydroxides; (2) reduction of higher oxidation-state-number oxymetal ions and subsequent precipitation as hydroxides that are separated from the solution; and (3) use of liquid-liquid exchange extraction procedures to separate certain impurities.

23 Claims, 1 Drawing Sheet

U.S. PATENT DOCUMENTS

| | | | |
|---|---|---|---|
| 4,733,328 A | 3/1988 | Blazej | |
| 4,772,576 A | 9/1988 | Kimura et al. | |
| 4,834,952 A * | 5/1989 | Rollat et al. | 423/157 |
| 4,839,339 A | 6/1989 | Bunker et al. | |
| 5,011,804 A | 4/1991 | Bergna et al. | |
| 5,017,446 A | 5/1991 | Reichman et al. | |
| 5,043,843 A | 8/1991 | Kimura et al. | |
| 5,045,170 A | 9/1991 | Bullock et al. | |
| 5,082,811 A | 1/1992 | Bruno | |
| 5,087,437 A | 2/1992 | Bruno et al. | |
| 5,116,560 A | 5/1992 | Dole et al. | |
| 5,116,790 A | 5/1992 | Bruno et al. | |
| 5,196,388 A | 3/1993 | Shyu | |
| 5,242,674 A | 9/1993 | Bruno et al. | |
| 5,252,311 A | 10/1993 | Riman et al. | |
| 5,340,510 A | 8/1994 | Bowen | |
| 5,362,472 A | 11/1994 | Lauter et al. | |
| 5,407,618 A | 4/1995 | Stephenson | |
| 5,417,956 A | 5/1995 | Moser | |
| 5,711,988 A | 1/1998 | Tsai et al. | |
| 5,730,874 A | 3/1998 | Wai et al. | |
| 5,731,948 A | 3/1998 | Yializis et al. | |
| 5,738,919 A | 4/1998 | Thomas et al. | |
| 5,744,258 A | 4/1998 | Bai et al. | |
| 5,776,239 A | 7/1998 | Bruno | |
| 5,797,971 A | 8/1998 | Zheng et al. | |
| 5,800,857 A | 9/1998 | Ahmad et al. | |
| 5,833,905 A | 11/1998 | Miki | |
| 5,850,113 A | 12/1998 | Weimer et al. | |
| 5,867,363 A | 2/1999 | Tsai et al. | |
| 5,900,223 A | 5/1999 | Matijevic et al. | |
| 5,929,529 A | 7/1999 | Lockemeyer | |
| 5,973,175 A | 10/1999 | Bruno | |
| 5,973,913 A | 10/1999 | McEwen et al. | |
| 6,005,764 A | 12/1999 | Anderson et al. | |
| 6,072,688 A | 6/2000 | Hennings et al. | |
| 6,078,494 A | 6/2000 | Hansen | |
| 6,195,249 B1 | 2/2001 | Honda et al. | |
| 6,228,161 B1 | 5/2001 | Drummond | |
| 6,243,254 B1 | 6/2001 | Wada et al. | |
| 6,268,054 B1 | 7/2001 | Costantino et al. | |
| 6,294,620 B1 | 9/2001 | Huang et al. | |
| 6,296,716 B1 | 10/2001 | Haerle et al. | |
| 6,331,929 B1 | 12/2001 | Masuda | |
| 6,352,681 B1 | 3/2002 | Horikawa et al. | |
| 6,410,157 B1 | 6/2002 | Nakamura | |
| 6,447,910 B1 | 9/2002 | Wataya | |
| 6,485,591 B1 | 11/2002 | Nakao | |
| 6,501,639 B2 | 12/2002 | Takafuji | |
| 6,550,117 B1 | 4/2003 | Tokuoka | |
| 6,673,274 B2 | 1/2004 | Venigalla et al. | |
| 6,692,721 B2 | 2/2004 | Hur et al. | |
| 6,703,719 B1 | 3/2004 | McConnell | |
| 6,715,197 B2 | 4/2004 | Okuyama | |
| 6,749,898 B2 | 6/2004 | Nakamura | |
| 6,905,989 B2 | 6/2005 | Ellis et al. | |
| 7,033,406 B2 | 4/2006 | Weir et al. | |
| 7,061,139 B2 | 6/2006 | Young | |
| 7,068,898 B2 | 6/2006 | Buretea et al. | |
| 7,228,050 B1 | 6/2007 | Buretea et al. | |
| 2001/0010367 A1 | 8/2001 | Burnell-Jones | |
| 2002/0186522 A1 | 12/2002 | Honda et al. | |
| 2003/0052658 A1 | 3/2003 | Baretich | |
| 2004/0135436 A1 | 7/2004 | Gilbreth | |
| 2006/0210779 A1 | 9/2006 | Weir et al. | |
| 2007/0148065 A1 | 6/2007 | Weir et al. | |
| 2008/0016681 A1 | 1/2008 | Eisenring | |

FOREIGN PATENT DOCUMENTS

| | | | |
|---|---|---|---|
| JP | 55154321 A | * | 12/1980 |
| JP | 63248719 | | 10/1988 |
| JP | 01179721 | | 7/1989 |
| JP | 05017150 | | 1/1993 |
| JP | 07291607 | | 11/1995 |
| JP | 11147716 | | 6/1999 |
| JP | 2003192343 A | * | 7/2003 |
| WO | 9316012 | | 8/1993 |

OTHER PUBLICATIONS

Bruno et al., "High-Performance Multilayer Capacitor Dielectrics from Chemically Prepared Powders", Journal of the American Ceramic Society, vol. 76, No. 5. pp. 1233-1241, 1993.

J. Kuwata et al., "Electrical Properties of Perovskite-Type Oxide Thin-Films Prepared by RF Sputtering", Jpn J. Appl. Phys., Part 1, 1985, 413-415.

F. Sears et al., "Capacitance—Properties of Dielectrics", University of Physics, Addison Wesley Publishing Company, Inc., Feb. 1984, pp. 516-533.

Mitsubishi Polyester Film Corporation specification sheet for Hostaphan (R) RE film for capacitors, Copyright 2007.

U.S. Appl. No. 11/499,594.

U.S. Appl. No. 10/917,144.

U.S. Appl. No. 11/497,744.

wikipedia.org; the free encylopedia; "ammonium hydroxide"; last modified Aug. 16, 2008; 1 page.

* cited by examiner

METHOD OF PURIFYING BARIUM NITRATE AQUEOUS SOLUTION

FIELD OF THE INVENTION

The present invention relates to methods for preparing ceramic powders, and particularly to purification of solutions used to make ceramic powders.

BACKGROUND OF THE INVENTION

Ceramic powders are used in the fabrication of numerous different types of devices including specialized mechanical components, coating for mechanical components, semiconductor devices, superconducting devices, device packaging, passive electronic components such as capacitors, and more sophisticated energy storage devices. Numerous different techniques exist for the synthesis and fabrication of ceramic powders including solid phase synthesis such as solid-solid diffusion, liquid phase synthesis such as precipitation and coprecipitation, and synthesis using gas phase reactants. Moreover, a host of related fabrication techniques can also be used including: spray drying, spray roasting, metal organic decomposition, freeze drying, sol-gel synthesis, melt solidification, and the like.

Various advantages of wet-chemical methods used in the preparation of powders for the fabrication of ceramics have been well-known since the early 1950s. Pioneering work in this area has been done at the Massachusetts Institute of Technology, the National Bureau of Standards (now the National Institute of Standards and Technology), Philips Research Laboratories, and Motorola, Inc.

Despite the advantages of wet-chemical processes, the ceramics industry largely remains reluctant to employ these techniques. Conventional methods for preparing ceramic powders entail mechanical mixing of dry powders of water-insoluble carbonates, oxides, and sometimes silicates, where each constituent of the ceramic composition is carefully selected individually. For example, if the ceramic composition has nine constituents in solid solution, then correspondingly nine starting powders are selected in accordance with the amount of each required for the end product compound. The starting powders are very likely to have different median particle sizes and different particle size distributions. In an attempt to comminute the mixture of powders to a smaller, more uniform particle size and size distribution for each component, the powder mixture is placed in a ball mill and milled for several hours. The milling process generates wear debris from the ball mill itself and, the debris becomes incorporated in the powder mixture. Because of the often wide disparity in particle size among the various commercially available starting powders (and even significant variation in particle size of the same powder from lot to lot), an optimum result from ball milling rarely occurs, and a contamination-free product is never obtained.

Moreover, additional processing steps are still required. Solid-solid diffusion at high temperature (but below the temperature at which sintering starts) of the ball-milled powder mixture is required to form a usable and, preferably, fully reacted homogeneous single powder. The finer each powder in the mixture is, the higher the particle surface-to-volume ratio is for each. This means that there is a greater surface area per unit weight of each powder for the solid-solid diffusion to occur. Moreover, longer times spent at high temperature (e.g., the calcining temperature) produce a more satisfactory end product. Homogeneity is improved by repeating several times the ball-milling and calcining steps in succession, each requiring several hours. Of course, this increases the amount of ball-milling wear debris added to the powder, thereby increasing the amount of contamination in the end ceramic product.

Accordingly, it is desirable to have improved precursor materials for wet-chemical processing techniques to prepare ceramic powders for use in the fabrication of various different devices and materials.

SUMMARY OF THE INVENTION

Purification techniques have been developed for ceramic powder precursors, e.g., barium nitrate. These techniques can be performed using one or more of the following operations: (1) removal of impurities by precipitation or coprecipitation and separation using a nonmetallic-ion-containing strong base, e.g., tetraalkylammonium hydroxides; (2) reduction of higher oxidation-state-number oxymetal ions and subsequent precipitation as hydroxides that are separated from the solution; and (3) use of liquid-liquid exchange extraction procedures to separate certain impurities.

In one embodiment in accordance with the invention a method is disclosed. A barium nitrate aqueous solution is provided. The barium nitrate aqueous solution is combined with a precipitant solution to cause precipitation of first impurities. The first impurities are separated from the barium nitrate aqueous solution. The barium nitrate aqueous solution is combined with a separation solution using a liquid-liquid extraction column to remove second impurities from the barium nitrate aqueous solution. In another embodiment, the product of this process is disclosed.

In still another embodiment in accordance with the invention, another method is disclosed. A barium nitrate aqueous solution is provided. The barium nitrate aqueous solution is combined with a precipitant solution to cause precipitation of first impurities. The barium nitrate aqueous solution pH is increased. Oxymetal ions in the barium nitrate aqueous solution are reduced to cause the precipitation of second impurities. The first and second impurities are separated from the barium nitrate aqueous solution. In yet another embodiment, the product of this process is disclosed.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

Figure 1:
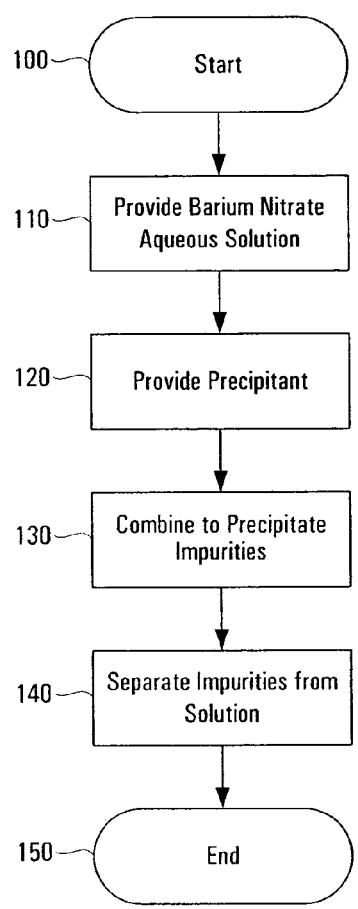
FIG. 1 is a flow chart illustrating purification operations in accordance with the present invention.

The following sets forth a detailed description of at least the best contemplated mode for carrying out the one or more devices and/or processes described herein. The description is intended to be illustrative and should not be taken to be limiting.

The processes and techniques described in the present application can be utilized to prepare numerous different types of ceramic powders and purified forms of related precursor materials, as will be understood to those skilled in the art. Thus, although the present application emphasizes the use of these processes and techniques in the fabrication of dielectric materials for use in electrical energy storage devices (e.g., doped or composition-modified barium titanate), the same or similar techniques and processes can be used in the preparation of other ceramic powders, and those ceramic powders may find application in the manufacture of various components, devices, materials, etc.

High-permittivity calcined composition-modified barium titanate powders can be used to fabricate high quality dielectric devices. U.S. Pat. No. 6,078,494 (hereby incorporated by reference herein in its entirety) describes examples of various doped barium titanate dielectric ceramic compositions. More specifically, the '494 patent describes a dielectric ceramic composition comprising a doped barium-calcium-zirconium-titanate of the composition $(Ba_{1-\alpha-\mu-\nu}A_\mu D_\nu Ca_\alpha)[Ti_{1-x-\delta-\mu'-\nu'}Mn_\delta A'_{\mu'} D'_{\nu'} Zr_x]_z O_3$, where A=Ag, A'=Dy, Er, Ho, Y, Yb, or Ga; D=Nd, Pr, Sm, or Gd; D'=Nb or Mo, $0.10 \leq x \leq 0.25$; $0 \leq \mu \leq 0.01$, $0 \leq \mu' \leq 0.01$, $0 \leq \nu \leq 0.01$, $0 \leq \nu \leq 0.01$, $0 \leq \delta \leq 0.01$, and $0.995 \leq z \leq 0 \leq \alpha \leq 0.005$. These barium-calcium-zirconium-titanate compounds have a perovskite structure of the general composition $ABO_3$, where the rare earth metal ions Nd, Pr, Sm and Gd (having a large ion radius) are arranged at A-sites, and the rare earth metal ions Dy, Er, Ho, Y, Yb and Ga (having a small ion radius) are arranged at B-sites. The perovskite material includes the acceptor ions Ag, Dy, Er, Ho, Y or Yb and the donor ions Nb, Mo, Nd, Pr, Sm and Gd at lattice sites having a different local symmetry. Donors and acceptors form donor-acceptor complexes within the lattice structure of the barium-calcium-zirconium-titanate according to the invention. The dielectric ceramic compositions described by the '494 patent are just some of the many types of ceramic compositions that can be fabricated using the purified precursor materials, processes and techniques of the present application.

The precursor purification techniques and devices of the present application can be used in conjunction with various wet-chemical processes for preparing barium titanate or other ceramic powders. Examples of those processes are described in, for example, U.S. Pat. No. 7,033,406 and U.S. patent application Ser. No. 11/369,255, entitled "Method of Preparing Ceramic Powders Using Chelate Precursors," filed Mar. 7, 2006, and naming Richard D. Weir and Carl W. Nelson as inventors, both of which are hereby incorporated by reference herein in their entirety.

Many wet-chemical processes for the manufacture of barium titanate (and composition-modified barium titanate), including the processes described above in the '406 patent and the '255 application, use one or more chelates as precursors to produce barium titanate in an aqueous solution. Aqueous solutions for some or all reactants are used to form the desired ceramic powder by, for example, coprecipitation. This approach extends the use of one or more chelates (preferably water-soluble and hydrolytically stable) as precursors to several of the component metal ions comprising the constituents of target ceramic powder. A nonmetal-ion-containing strong base, e.g., selected from among tetraalkylammonium hydroxides, such as tetramethylammonium hydroxide $[(CH_3)_4NOH]$ in aqueous solution is used as the precipitant for the mixture of precursors in aqueous solution. The tetraalkylammonium hydroxides, unlike conventional strong bases, e.g., sodium and potassium hydroxides, do not introduce contamination metal ions, e.g., sodium and potassium ions, to the end product. Note that there are numerous organic compounds that are basic in pH, but the tetraalkylammonium hydroxides as a group are the only organic compounds that are strong bases, e.g., as strong as common ones: NaOH and KOH, which are inorganic compound bases.

In one example of ceramic powder manufacturing, at least one, but not necessarily all of the precursors are chelates. A separate solution of tetramethylammonium hydroxide, possibly in excess of the amount required, is made in deionized (DI) water free of dissolved carbon dioxide ($CO_2$) and heated to 80°-85° C. The two solutions are mixed by pumping the heated ingredient streams simultaneously through a coaxial fluid jet mixer. A slurry of the coprecipitated powder is produced and collected in a drown-out vessel. The coprecipitated powder is refluxed in the drown-out vessel at 90°-95° C. for 12 hr and then filtered, optionally deionized-water washed, and dried. Alternatively, the powder can be collected by centrifugal sedimentation, or some other technique. The subsequent powder is calcined under suitable conditions, e.g., at 1050° C. in air in an appropriate silica glass (fused quartz) tray or tube.

Still other techniques and devices can be used to combine the ingredient streams such as, for example: (1) pouring one solution in one vessel into the other solution in another vessel and using mechanical or ultrasonic mixing, and (2) metering the solution in one vessel at some given flow rate into the other solution in another vessel and using mechanical or ultrasonic mixing. Numerous other mixing techniques will be known to those skilled in the art. The resulting slurry can be refluxed as appropriate. Next, the slurry is transferred to a filtration or separation device. The separating of the precipitate from the liquid phase and the isolation of precipitate can be carried out using a variety of devices and techniques including: conventional filtering, vacuum filtering, centrifugal separation, sedimentation, spray drying, freeze drying, or the like. The filtered powder can then undergo various washing, drying, and calcining steps as desired.

Among the precursor materials used in the manufacture of barium titanate is barium nitrate, $Ba(NO_3)_2$. In general, nitrate compounds at a given temperature have the highest solubilities in water of any salt. Uniquely, there are no water-insoluble nitrates. Since the nitrate anion $[(NO_3)^-]$ does not interfere with the formation of chelates, the nitrates, too, can be used as starting compounds. Nitrates such as barium nitrate are readily available commercially, but they may not be readily available in desirable purified forms.

A generalized procedure for the purification of barium nitrate in aqueous solution is outlined below. The process includes several steps: (1) removal of impurities by precipitation or coprecipitation and separation using a nonmetallic-ion-containing strong base, e.g., tetraalkylammonium hydroxides; (2) reduction of higher oxidation-state-number (e.g., 6 and 7) oxymetal ions to four or lower in oxidation state number and subsequent precipitation as hydroxides that are separated from the solution; and (3) use of liquid-liquid exchange extraction procedures to separate sodium, potassium, calcium, and strontium ions.

In general, many impurities can be more easily removed from water-soluble chemical compounds that are stable in both acid and basic solution. Among impurities present in the greatest amount are compounds of magnesium, aluminum, and iron, having high relative abundances in the earth's crust. Among the structural metals, magnesium, aluminum, and iron are the three most abundant. All of these metals are impurity sources found in barium nitrate aqueous solution. Thus, removal of many of these metal and oxymetal ions via precipitation using a nonmetallic-ion-containing strong base is the first step in the purification process.

A purification procedure for the water-soluble barium nitrate compound involves precipitation not only of the hydroxides of magnesium, aluminum, and iron, but also of the hydrated metal ions and oxymetal ions of CAS Groups IIIB, IVB, VB, VIB, VIIB, VIII, IB, IIB, IIIA, IVA, VA, beryllium and magnesium of Group IIA, and the lanthanides and actinides of the Periodic Table. For the simple hydrated metals ions with oxidation state numbers of 1, 2, and 3, and the oxymetal ions with oxidation state numbers of 4 and 5, these are precipitated as hydroxides and/or hydrous oxides by addition of a nonmetallic-ion-containing strong base, such as tetramethylammonium hydroxide. As noted above, tetraalkylammonium hydroxides, including tetramethylammonium hydroxide, do not introduce contamination metal ions to the end product. This is in contrast to other strong bases, such as sodium hydroxide (NaOH) or potassium hydroxide (KOH), where some sodium and potassium ions, in spite of copious washing with DI water, become incorporated in the end product.

While the strong base can be used to obtain a variety of pH values, in one embodiment the solution is maintained at a pH in the range of approximately 7.5 to just below 8.5. This range is useful for producing impurity precipitates that are more easily separated from the solution. For example, the classic amphoteric aluminum hydroxide $[(Al(OH)_3]$, aluminum oxide hydroxide [AlO(OH)], and hydrous aluminum oxide $[Al_2O_3 \cdot xH_2O]$ are stable in the pH range of 4.0 to 8.5, dissolving in acidic solutions below pH 4.0 and in basic solutions above pH 8.5, thereby limiting the effective range for the precipitation and subsequent separation of the hydroxides and/or hydrous oxides of the impurity metal ions. Aluminum ions are most likely present in acidic solution as $[Al(H_2O)_4]^{+3}$ and in basic solution as $[Al(OH)_4]^-$. Thus the selection of approximately pH 7.5 represents a good choice for the removal of the largest number of hydrated metal ion and oxymetal ion impurities.

The barium nitrate aqueous solution is mixed with the strong base in an appropriate reaction vessel. In one embodiment, the two materials are mixed using a recirculating pump. Using a pH sensor in contact with the solution, the current pH of the solution can be monitored while the strong base (e.g., $(CH_3)_4NOH$) is metered into the solution. The recirculation pump, or some other mechanical mixing mechanism, provides for adequate agitation with continuous filtration of the solution. If the monitored pH becomes too high, the pH can be lowered to a desired value by slow addition of dilute $HNO_3$ or another suitable acid.

Various other techniques can be used to mix the two materials. For example, the ingredient streams can be combined by pouring one solution in one vessel into the other solution in another vessel and using mechanical or ultrasonic mixing; the solution in one vessel can be metered out at a given flow rate into the other solution in another vessel and mixed using mechanical or ultrasonic methods; and the ingredient streams can be mixed by simultaneously pumping them through a coaxial fluid jet mixer. Other mixing techniques can be known to those skilled in the art. Moreover, various different parameters such as temperature, mixing duration, and the like can be controlled as part of the precipitation reaction.

Next the precipitate impurities are filtered out of the solution. Numerous different filtration and other separation techniques can be used to remove the precipitates, as will be well known to those skilled in the art. Such techniques can include, but are not limited to, colloidal filtration, pressure filtration, vacuum filtration, various other dead-end filtration techniques, crossflow filtration, centrifugation, sedimentation, membrane separation techniques, and the like. In one embodiment, the filtration system is comprised of a back-washable pleated all-polypropylene filter cartridge (or multiple cartridges in parallel) having a filtration rating of 99.98% ($\beta$=5000) removal efficiency at 0.2 μm pore size. This filter cartridge is followed by a high-surface-area hydrophilic polyethersulfone (PES) membrane filter cartridge (or multiple cartridges in parallel) with 100% (or near 100%) removal efficiency at 0.03 μm pore size.

However the initial precipitates are separated from the aqueous barium nitrate solution, the remaining more purified solution is ready for the next purification step. For the removal of oxymetal ions with oxidation state numbers of 6 and 7, which are stable in basic solution (as well as in acidic solution), the procedure for the first step generally does not work. To circumvent this problem, a nonmetallic-ion-containing reducing agent is used to lower the oxidation state number of oxymetal ions remaining in the barium nitrate aqueous solution. Hydrogen peroxide ($H_2O_2$) is suitable for this purpose, acting as a reducing agent in sufficiently basic solution, for example, at pH 10. For example, the chromate (VI) $[(CrO_4)^{-2}]$ ion is reduced to chromium(III) ($Cr^{+3}$) ion by hydrogen peroxide in basic solution, precipitating as chromium(III) hydroxide $[Cr(OH)_3]$:

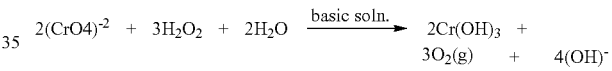

Thus, a strong base is added to the barium nitrate aqueous solution, e.g., the strong base $(CH_3)_4NOH$ or another tetraalkylammonium hydroxide, to raise the pH level. The higher-oxidation-state-number oxymetal ions can then be placed in lower oxidation state numbers using hydrogen peroxide as the reducing agent. Once in the lower oxidation states, the oxymetal ions can be effectively removed by the hydroxide and/or hydrous oxide precipitation described above.

The additional precipitate impurities are removed using the same or similar filtration or separation techniques described above. Since the resulting barium nitrate solution is still very basic (e.g., pH 10), it is neutralized to approximately pH 7 by, for example, the addition of dilute nitric acid ($HNO_3$) solution, in preparation for the next procedure. While various acids can be used, nitric acid as many advantages. Other strong acids, e.g., sulfuric ($H_2SO_4$), hydrochloric (HCl), and perchloric ($HClO_4$), are not practical because either water-insoluble barium sulfate is formed, in the case of sulfuric acid, or the acid is corrosive to stainless steel (e.g., HCl and $HClO_4$). Moderate and weak acids are not nearly as effective in adjusting pH because large volume amounts are needed as compared to strong acids. Other acids such as phosphoric acid ($H_3PO_4$) and oxalic acid produce water-insoluble barium compounds $[(Ba_3(PO_4)_2]$ and ($BaC_2O_4$), respectively, in addition to being corrosive to stainless steel.

The remaining impurities in the barium nitrate solution include compounds of sodium, potassium, and calcium. These nonstructural metals have high relative abundances in the earth's crust, and are therefore common. Still another remaining impurity is strontium. For barium nitrate, strontium is a significant impurity because of the similar chemistry of strontium and barium. This similarity makes effective separation by conventional techniques, e.g., fractional crystallization, very difficult.

Thus, the final purification operation involves removal of these impurities from the water-soluble barium nitrate compound using a liquid-liquid extraction technique. Liquid-liquid extraction is a mass transfer operation whereby a feed solution is contacted with a liquid solvent that is immiscible with one or more, but not all, of the components of the feed solution. During this contact, the material to be removed from the feed (the solute) is transferred from the feed phase to the solvent phase. The phases are then separated, generating an extract phase (solvent that has "picked up" the solute) and raffinate phase (original feed solution minus the solute). Although various devices and techniques can be used to facilitate contact, column-type contactors are common because they allow the phases to flow countercurrently due to the density difference between the liquids. A well-designed extraction column works by generating a number of stages within the column to more efficiently transfer the solute from one liquid phase to the other.

Liquid-liquid extraction columns include both static columns (such as sieve tray columns, random packed columns, and structured packed columns) and agitated columns (such as Karr columns, Scheibel columns, rotating disk contactor columns, and pulsed columns). In one embodiment of the present invention, a Karr liquid-liquid extraction column of the type provided by Koch Modular Process Systems, of Paramus, N.J., is used. The Karr column includes two inlets, one at the top of the column and one at the bottom of the column, for introduction of the two immiscible liquids. The liquids can be introduced under pressure and/or at specified temperatures as desired. The Karr column includes a tank having a vertical rod attached to various perforated shelves. Using a motorized drive assembly, the rod is vertically reciprocated, thereby moving the perforated shelves up and down at a desired rate. Due to density differences among the two immiscible liquids, they move in opposite direction in the column, i.e., one moves from the bottom to the top, and the other moves from the top two the bottom. The vertical reciprocation of the shelves and the fact that the shelves have perforations substantially increases the surface area between separate liquids. In this way, a solvent functions to extract contaminants from a target liquid. The solvent having the contaminants dissolved therein is recovered and reused after appropriate treatment, while the purified liquid is separately extracted from the column.

In the case of barium nitrate purification, the two immiscible solutions are the barium nitrate aqueous solution and a separation solution formed, for example, from nonaqueous decanoic acid [$CH_3(CH_2)_8COOH$] and kerosene. Because of the similarity of chemistry for the element pairs zirconium/hafnium and strontium/barium, these pairs are very difficult to separate. Decanoic acid [$CH_3(CH_2)_8COOH$] in kerosene (as the hydrocarbon solvent) used in a liquid-liquid extraction column can effectively extract strontium ions ($Sr^{+2}$) from the aqueous solution of barium nitrate having strontium nitrate [$Sr(NO_3)_2$] as an impurity. This extraction occurs through ion exchange with hydrogen ions of the decanoic acid, and is accomplished without extracting barium ions. The extracted strontium ions form strontium decanoate {[$CH_3(CH_2)_8COO]_2Sr$}. The degree of polarity of the decanoic acid molecule is such that its nonpolar part, the carbon chain length [$CH_3(CH_2)_8—$] versus its polar part, the carboxyl group (—COOH), provides the attractive power with two decanoic acid molecules per strontium ion to capture $Sr^{+2}$ ions and not the slightly larger $Ba^{+2}$ ions. Furthermore, the liquid-liquid extraction is effective because the polarity of decanoic acid is insufficient for solubility in water and the nonpolarity of decanoic acid is sufficient for solubility in hydrocarbon solvents, such as kerosene, and the decanoates (the salts of the reaction) formed are insoluble in both water and hydrocarbon solvents.

While kerosene is a preferred liquid hydrocarbon mixture as solvent for the solute decanoic acid, other liquid hydrocarbons can be used. Examples include gasoline without additives (e.g., 2-propanol), jet fuel, diesel fuel, fuel oil, or other hydrocarbon fluids. Kerosene is useful because of its cost-effectiveness and wide availability without undesirable additives. Since the boiling point range of kerosene is 175° to 325° C., the flammability of kerosene is much less than that of gasoline. Moreover, kerosene is generally easier to recover as compared to other hydrocarbons.

The kerosene/decanoic acid solution is fed into the bottom of the Karr column and the barium nitrate aqueous solution is fed into the top of the column. Within the column, an adjustable-speed turbine provides the mixing of the two counter-flowing immiscible solutions. The speed is set to maximize the interfacial surface area of these two solutions so that efficient ion exchange of $Na^+$, $K^+$, $Ca^{+2}$, and $Sr^{+2}$ ions from the aqueous solution with the hydrogen ($H^+$) ions of decanoic acid in kerosene takes place. Care must be taken to reach the near-emulsion state, without forming an emulsion, so that the immiscible mixture can readily separate into two solutions.

For example, the solution in the column can be visually inspected to determine if the emulsion state is reached or is near. If so, column agitation (e.g., turbine/impeller speed) can be stopped or adjusted to prevent emulsion formation. In this manner, proper column operation conditions can be empirically determined. In some embodiments, the kerosene/decanoic acid levels can be monitored and adjusted using a spectrographic technique such as Fourier-transform infrared (FTIR) spectroscopy. Such techniques can further aid determinations regarding the solution's emulsion state. Column operation typically occurs at room temperature and atmospheric pressure, but such conditions can be adjusted as desired.

The purified barium nitrate aqueous solution is drawn from the column bottom, and the decanoic acid/kerosene solvent solution containing the decanoates of the impurities is drawn from the column top. Examples of the impurity reaction are illustrated below:

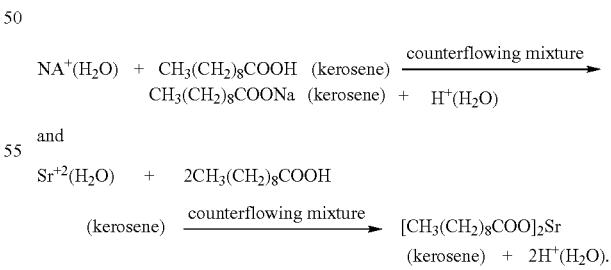

The decanoic acid/kerosene solution containing decanoate precipitate impurities, e.g., strontium decanoate or those containing $Na^+$, $K^+$, and $Ca^{+2}$ ions, is filtered through a back-washable tubular ceramic nanofiltration array to remove the precipitates. Other filtration systems can be used. This allows the solution to be recycled and replenished with decanoic acid when its concentration becomes sufficiently low. As noted above, concentration can be monitored using an FTIR spectrometer. The ceramic filter array and its housing can be cleaned by backwashing with dilute nitric acid solution, which has the effect of converting the decanoates to decanoic acid and the respective water-soluble nitrate salts. These nitrate salts are then backwashed away using DI water. The decanoic acid is backwashed away using 2-propanol, in which it is soluble. Drying the filter array and housing clean dry air completes preparation of the filter for reuse. As will be known to those skilled in the art, the dominating cost in liquid-liquid extraction is solvent recovery. These techniques accomplish solvent recovery in cost-effective manner.

As noted above, removal of these impurities from the precursors used to manufacture composition-modified barium titanate compounds is very important. The most undesirable impurities and/or constituent oxides in solid solution are those of sodium, potassium, and strontium. Sodium and potassium ions, being singly charged, have relatively high ionic mobilities in oxide ceramics and silicate glasses. When an electric field is applied to these materials an ionic conductivity is contributed by these mobile ions, leading to electrical loss and a much decreased dielectric breakdown strength. Strontium ions being doubly charged are not mobile. However, strontium oxide as a constituent oxide in composition-modified barium titanate has the effect of adjusting the Curie point of the material, and also the effect of significantly decreasing the material's relative permittivity. Calcium ions being doubly charged are also not mobile. Calcium oxide as a constituent oxide in composition-modified barium titanate has the effect of adjusting the Curie point of the material without decreasing the relative permittivity, which is desirable.

Flow charts illustrating examples of the various phases of purification described above are shown in FIGS. 1-3. FIG. 1 is a flow chart illustrating what is typically the first phase of barium nitrate purification techniques in accordance with the present invention. The process begins at 100. In operation 110, the barium nitrate to be purified is provided in aqueous solution. Next, a suitable precipitant is provided (120), for example any one of the tetraalkylammonium hydroxides such as tetramethylammonium hydroxide. The two materials are then combined to cause the precipitation or coprecipitation of impurity materials (130). Once the impurity precipitants are formed, they can be separated from the solution using various known separation techniques (140). The process ends (150), and the result is an initially purified barium nitrate aqueous solution.

Figure 2:
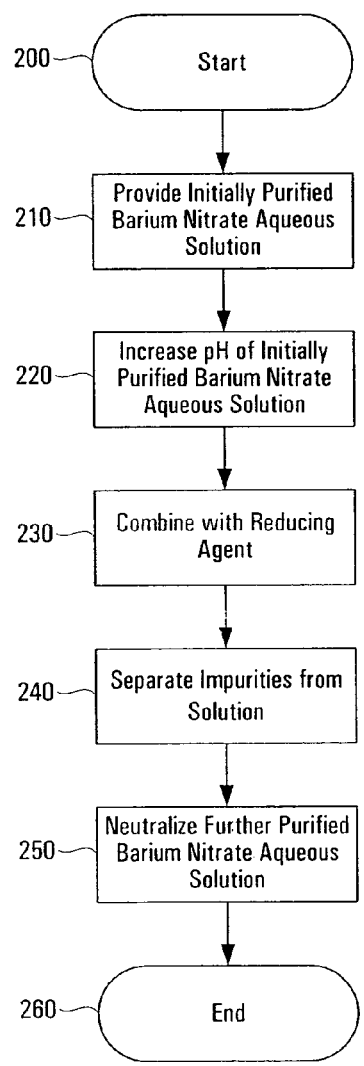
FIG. 2 is a flow chart illustrating other purification operations in accordance with the present invention.

FIG. 2 is a flow chart illustrating what is typically the second phase of barium nitrate purification techniques in accordance with the present invention. The process begins at 200. In operation 210, the initially purified barium nitrate to be further purified is provided in aqueous solution. Next, the pH of the initially purified barium nitrate aqueous solution is increased (220) using, for example, any one of the tetraalkylammonium hydroxides such as tetranethylammonium hydroxide. In step 230, a reducing agent, e.g., hydrogen peroxide acting as such in basic solution, is added. The conditions are now suitable for further precipitation or coprecipitation of additional impurities. Once the additional impurity precipitants are formed, they can be separated from the solution using various known separation techniques (240). This yields a further purified barium nitrate aqueous solution. Since the further purified barium nitrate aqueous solution is typically very basic at this point in processing, it can be neutralized using a suitable acid (250). The process ends (260).

Figure 3:
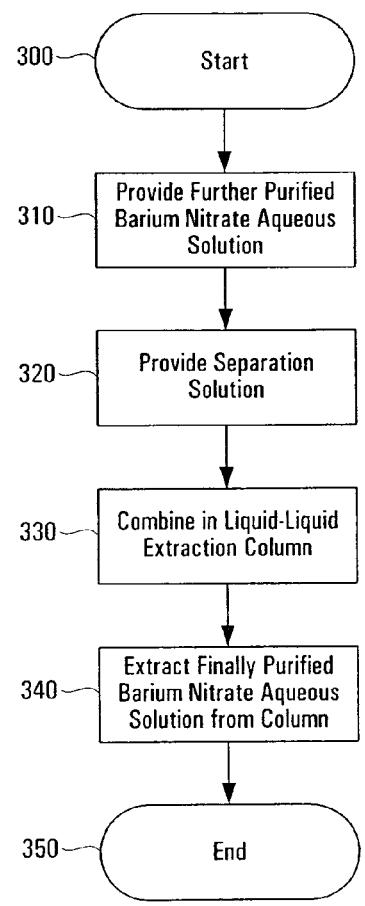
FIG. 3 is a flow chart illustrating still other purification operations in accordance with the present invention.

FIG. 3 is a flow chart illustrating what is typically the last phase of barium nitrate purification techniques in accordance with the present invention. The process begins at 300. In operation 310, the further purified barium nitrate to be still further purified is provided in aqueous solution. Next, a suitable solute/solvent solution for use in a liquid-liquid extraction process is also provided (320). Various different solvents can be used as described above. In step 330, the further purified barium nitrate aqueous solution and decanoic acid/kerosene solution are combined in a liquid-liquid extraction column. The finally purified barium nitrate aqueous solution is extracted from the column (340), and the process ends (350).

The flow charts of FIGS. 1-3 illustrate many techniques that can be used to purify barium nitrate. Those having ordinary skill in the art will readily recognize that certain steps or operations illustrated in FIGS. 1-3 can be eliminated or taken in an alternate order. Moreover, although the operations of FIGS. 1-3 are shown as happening in the respective order of the figures, that need not be the case. For example, the purification steps of FIG. 2 can be performed before those of FIG. 1. Various operations from among the figures can also be combined into a more integrated process.

Note that in all of the various purification techniques described above, it is unlikely that absolutely all impurities of any particular type will be removed. However, each set of operations will improve the purity of the barium nitrate by removing at least some of the target impurities. Purified barium nitrate produced using the techniques described above has a variety of applications including use in the fabrication of high-quality barium titanate and composition-modified barium titanate. With increased purification of the barium nitrate precursor material comes improved electrical properties of the resulting barium titanate, which in turn leads to devices having higher relative permittivities and increased dielectric breakdown strengths. Moreover, those having ordinary skill in the art will recognize that these techniques can be extended for use in the purification of similar compounds.

In the examples illustrated above, various compounds, solutions, temperature ranges, pH ranges, quantities, weights, and the like are provided for illustration purposes. Those having skill in the art will recognize that some or all of those parameters can be adjusted as desired or necessary. Moreover, while the use of certain specific devices is described above, various different devices can be used in the execution of the purification operations of the present application.

Although the present invention has been described with respect to specific embodiments thereof, various changes and modifications may be suggested to one skilled in the art and it is intended that the present invention encompass such changes and modifications as fall within the scope of the appended claims.

What is claimed is:

1. A method of purifying a barium nitrate aqueous solution, the method comprising:
    providing the barium nitrate aqueous solution;
    combining the barium nitrate aqueous solution with a precipitant solution to cause precipitation of first impurities, the first impurities comprising at least one of magnesium hydroxide, aluminum hydroxide, or iron hydroxide, the precipitant solution comprising tetraalkylammonium hydroxide;
    separating the first impurities from the barium nitrate aqueous solution; and
    following separating the first impurities, combining the barium nitrate aqueous solution with a separation solution using a liquid-liquid extraction column to remove second impurities from the barium nitrate aqueous solution, the second impurities comprising strontium ions.

2. The method of claim 1 wherein the precipitant solution further comprises a pH in the range of approximately 7.5 to nearly but below 8.5.

3. The method of claim 1 the combining the barium nitrate aqueous solution with the precipitant solution further comprises:
   metering the precipitant solution into the barium nitrate aqueous solution; and
   mixing the barium nitrate aqueous solution and the precipitant solution using at least one of a mechanical mixer and a recirculating pump.

4. The method of claim 1 wherein the separating uses at least one of colloidal filtration, pressure filtration, vacuum filtration, dead-end filtration, crossflow filtration, centrifugation, sedimentation, membrane separation, a pleated all-polypropylene filter, and a hydrophilic polyethersulfone (PES) membrane filter.

5. The method of claim 1 further comprising:
   reducing oxymetal ions in the barium nitrate aqueous solution to cause the precipitation of third impurities.

6. The method of claim 5 further comprising:
   increasing barium nitrate aqueous solution pH before the reducing oxymetal ions.

7. The method of claim 6 wherein the increasing barium nitrate aqueous solution pH further comprises:
   combining a nonmetal-ion-containing strong base with the barium nitrate aqueous solution.

8. The method of claim 7 wherein the combining the nonmetal-ion-containing strong base with the barium nitrate aqueous solution further comprises:
   combining a tetraalkylammonium hydroxide solution with the barium nitrate aqueous solution to increase barium nitrate aqueous solution pH to approximately 10.

9. The method of claim 5 wherein the reducing further comprises:
   reducing oxymetal ions in the barium nitrate aqueous solution using a nonmetallic-ion-containing reducing agent.

10. The method of claim 9 wherein the reducing agent is hydrogen peroxide.

11. The method of claim 5 wherein the reducing further comprises:
   reducing oxidation-state numbers for oxymetal ions in the barium nitrate aqueous solution to four or lower in oxidation state number.

12. The method of claim 5 further comprising:
   separating the third impurities from the barium nitrate aqueous solution.

13. The method of claim 1 wherein the separation solution further comprises at least one of decanoic acid and kerosene.

14. The method of claim 1 wherein the combining the barium nitrate aqueous solution with the separation solution using the liquid-liquid extraction column further comprises:
   using at least one of a static liquid-liquid extraction column, an agitated liquid-liquid extraction column, a sieve tray column, a random packed column, a structured packed column, a Karr column, a Scheibel column, a rotating disk contactor column, and a pulsed column.

15. The method of claim 1 wherein the combining the barium nitrate aqueous solution with the separation solution using the liquid-liquid extraction column further comprises:
   reaching a near-emulsion state between the barium nitrate aqueous solution and the separation solution.

16. The method of claim 1 further comprising:
   removing the barium nitrate aqueous solution from the liquid-liquid extraction column.

17. The method of claim 1 wherein the first impurities further comprise at least one of:
   a magnesium hydroxide;
   an aluminum hydroxide;
   an iron hydroxide;
   a hydrated metal ion of at least one of groups IIIB, IVB, VB, VIIB, VIIB, VIII, IB, IIB, IIIA, IVA, and VA;
   a hydrated metal ion of at least one of the lanthanides and actinides;
   a beryllium hydrated metal ion;
   a magnesium hydrated metal ion;
   an oxymetal ion of at least one of groups IVB, VB, VIIB, VIIB, IVA, and VA; and
   an oxymetal ion of at least one actinide.

18. The method of claim 1 wherein the second impurities further comprise at least one of sodium ions, potassium ions, strontium ions, and calcium ions.

19. The method of claim 1 further comprising:
   neutralizing the barium nitrate aqueous solution before the combining the barium nitrate aqueous solution with the separation solution using the liquid-liquid extraction column.

20. A method of purifying a barium nitrate aqueous solution, the method comprising:
   providing the barium nitrate aqueous solution;
   combining the barium nitrate aqueous solution with a precipitant solution to precipitate first impurities, the first impurities comprising at least one of magnesium hydroxide, aluminum hydroxide, or iron hydroxide, the precipitant solution comprising tetraalkylammonium hydroxide and having a pH in the range of 7.5 to 8.5;
   separating the first impurities from the barium nitrate aqueous solution;
   following separating the first impurities, increasing the pH of the barium nitrate aqueous solution after separating the first impurities;
   reducing the oxymetal ions in the barium nitrate aqueous solution to precipitate second impurities, the second impurities including ions that have an oxidation-state-number of 6 or 7 prior to reducing;
   separating the second impurities from the barium nitrate aqueous solution; and
   following separating the second impurities, combining the barium nitrate aqueous solution with a separation solution using a liquid-liquid extraction column to remove third impurities from the barium nitrate aqueous solution, the third impurities comprising strontium ions.

21. The method of claim 20, wherein increasing the pH of the barium nitrate aqueous solution includes increasing the pH to approximately 10.

22. The method of claim 20, wherein the separation solution includes decanoic acid.

23. A method of purifying a barium nitrate aqueous solution, the method comprising:
   providing the barium nitrate aqueous solution;
   combining the barium nitrate aqueous solution with a precipitant solution to precipitate first impurities, the first impurities comprising at least one of magnesium hyroxide, aluminum hydroxide, or iron hydroxide, the precipitant solution comprising tetraalkylammonium hydroxide and having a pH in the range of 7.5 to 8.5, strontium ions substantially remaining in solution;
   separating the first impurities from the barium nitrate aqueous solution;

increasing the pH of the barium nitrate aqueous solution to approximately 10 using tetraalkylammonium hydroxide after separating the first impurities;

reducing the oxymetal ions in the barium nitrate aqueous solution to precipitate second impurities, the second impurities including ions that have an oxidation-state-number of 6 or 7 prior to reducing;

separating the second impurities from the barium nitrate aqueous solution; and following separating the second impurities, combining the barium nitrate aqueous solution with a separation solution using a liquid-liquid extraction column to remove third impurities from the barium nitrate aqueous solution, the third impurities comprising strontium ions, the separation solution including decanoic acid.

* * * * *